No. 834,876. PATENTED OCT. 30, 1906.
A. J. SEAMAN.
MAYONNAISE MIXER.
APPLICATION FILED OCT. 9, 1905.

2 SHEETS—SHEET 1.

Witnesses.
Raphael G. Blanc.
Sadie E. Powers.

Inventor.
Albert J. Seaman.
By Charles F. A. Smith,
Attorney.

No. 834,876. PATENTED OCT. 30, 1906.
A. J. SEAMAN.
MAYONNAISE MIXER.
APPLICATION FILED OCT. 9, 1905.
2 SHEETS—SHEET 2.
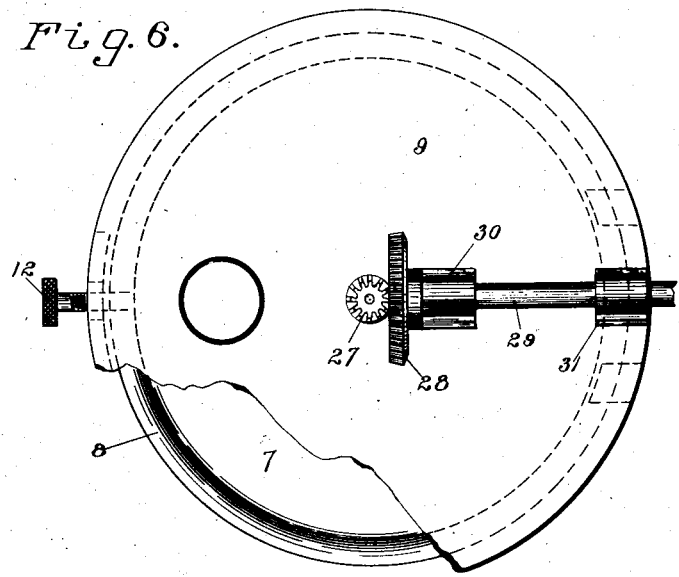
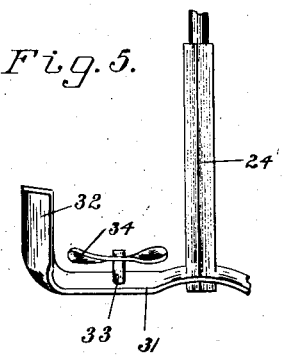
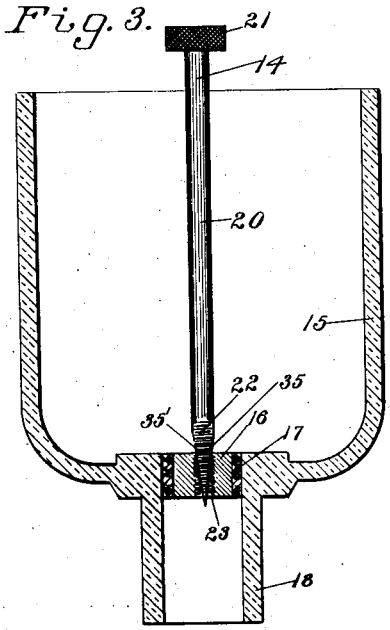
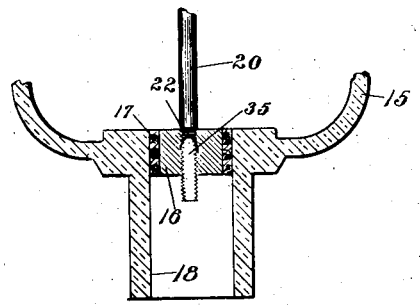
Witnesses
Raphael G. Blanc.
Sadie E. Powers
Inventor.
Albert J. Seaman.
By Charles F. A. Smith,
Attorney.

UNITED STATES PATENT OFFICE.

ALBERT JOHN SEAMAN, OF BOSTON, MASSACHUSETTS.

MAYONNAISE-MIXER.

No. 834,876.　　　　　　Specification of Letters Patent.　　　　　Patented Oct. 30, 1906.

Application filed October 9, 1905. Serial No. 281,939.

*To all whom it may concern:*

Be it known that I, ALBERT JOHN SEAMAN, a citizen of the United States, residing at Boston, in the county of Suffolk and State of Massachusetts, have invented certain new and useful Improvements in Mayonnaise-Mixers, of which the following is a specification, reference being had therein to the accompanying drawings.

This invention relates to improvements in a machine for mixing salad-dressing, especially a dressing having olive-oil as one of its ingredients and known as "mayonnaise," and is designed so that the device may be quickly applied to any dish having a rim of proper diameter and, after the dressing has been prepared, quickly and easily removed, so that the dressing may be allowed to remain in the dish as long as desired.

The device may also be used in the churning of butter or in the mixing of any substance that can be stirred or otherwise agitated by a revolving dasher.

The invention consists in the combination of elements and in certain parts of construction entailed in the combination of said elements to obtain the desired result.

A full understanding of the invention can best be given by a detailed description of a preferred construction embodying the various features of the invention, and such a description will now be given in connection with the accompanying drawings; and I attain my object by the mechanism there illustrated, showing such preferred construction, and the features forming the invention will then be specifically pointed out in the claims.

Figure 1:
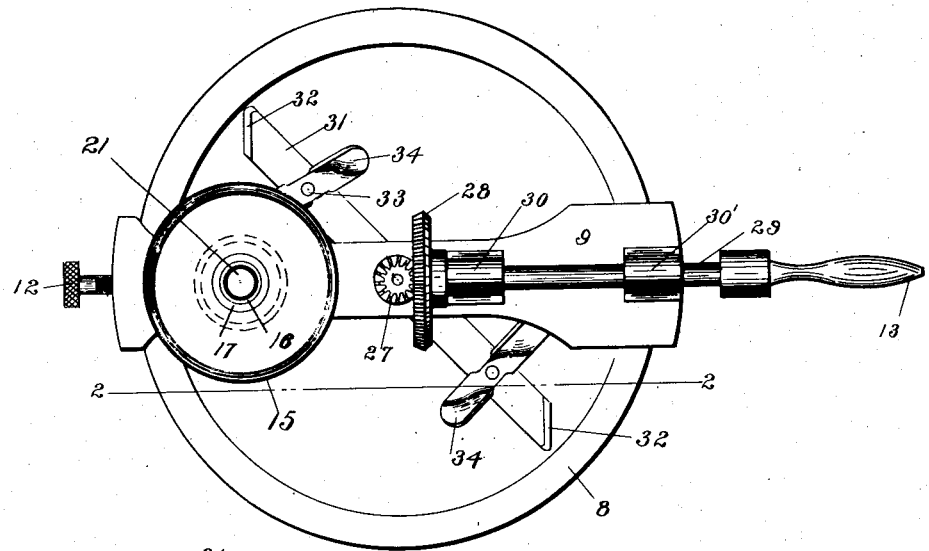
Figure 2:
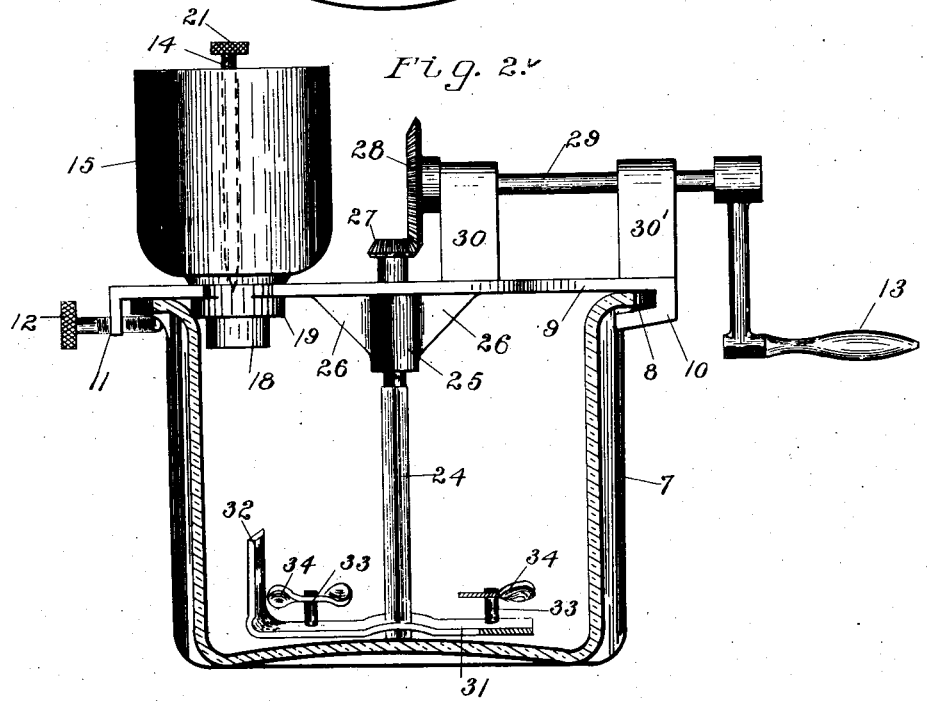

In the drawings, Figure 1 is a plan view showing a salad-mixing dish and my invention applied thereto. Fig. 2 is a sectional elevation of the same on the line 2 2 of Fig. 1. Fig. 3 is an enlarged sectional elevation of the oil-dropper partly opened. Fig. 4 is a similar view with the dropper closed. Fig. 5 is an enlarged view of part of the dasher. Fig. 6 is a plan view of my device when used as a butter-churn with the oil-dropper removed and the cover extended to completely cover the top of the disk.

Latitude is allowed herein as to details, as they may be changed or varied at will without departing from the spirit of my invention and the same yet remain intact and be protected.

Corresponding and like parts are referred to in the following description and indicated in all the views of the drawings by the same reference characters.

In the drawings the numeral 7 represents any suitable vessel or receptacle, preferably a glass or porcelain bowl, having at its top a circumferential outward-extending flange or rim 8, on which rim 8 the cover 9 rests. This cover has one or more lugs 10 and one or more depending ears 11 for holding the cover upon the bowl 7, and the cover 9 is securely locked thereon by a thumb-screw 12, secured through one of the ears 11 and against the outer side of the bowl immediately under the rim 8, so that as great speed is obtained with the revolving dasher on turning of the handle 13 by the operator the cover will not fly off. This cover 9 may, if desired, as shown in Fig. 1, only cover a portion of the bowl 7, as is preferable in making mayonnaise or other dressings, when it is desirable to watch the mixing of the oil with the eggs and other ingredients, so that the oil may be increased as desired by movement of the needle-valve 14, or the cover may, as shown in Fig. 6, cover the entire upper portion of the bowl, as is preferable if butter is to be churned, when it is not necessary to use the oil-dropper, which may be removed and a stopper inserted to cover up the opening, or, if desired, the cover could be made without an opening.

The oil-dropper consists of a cup 15, having in its bottom an opening in which is inserted a circular plate 16 and securely held in place by a leather washer 17 or other suitable packing. A circumferential tube or pipe 18 extends downward from this opening in the cup's bottom, and it is adapted to be inserted in an opening in the cover 9, which opening may be provided with a flange 19, projecting downward from its inner edge, as shown in Fig. 2, so as to more firmly hold the cup in an upright position.

The plate 16 is provided with a threaded hole 23, through which the oil is dropped into the bowl 7. In order to regulate the amount of oil passing through this hole, I provide a needle-valve 14, which has a shank portion 20, carrying a head 21 and threaded at its lower portion, as at 22, but having a portion of the thread cut away, as at 35 35', and clearly shown in Figs. 3 and 4, so that as the needle is unscrewed and the needle-point raised within the plate 16 the amount of oil flowing through the hole 23 is greatly increased and when sufficient oil has been applied the valve can be closed, as shown in Fig. 4, even while the revolving dasher is in use.

The dasher is provided with a central vertical shaft 24, extending downward through an opening in the cover and supported by a hub 25, attached to or made integral with the cover on its under side and having one or more strengthening-ribs 26. This vertical shaft 24 carries at its upper end a pinion 27, meshing with a gear-wheel 28 on a horizontal shaft 29, supported in the arms 30 30', and to which shaft 29 the operating-handle 13 is attached.

The vertical shaft 24 is arranged centrally of the bowl and carries at its lower end near the bottom of the bowl the revolving dasher consisting of cross-arms 31, preferably flat and having upward-extending ends or stirrer-blades 32, preferably at right angles to it, slanted or curved inward and operating in spaced paths of movement in the outer portion of the bowl, as shown in Figs. 1, 2, and 5. These cross-arms 31 may also be provided with upward-extending studs or pivot-pins 33, upon which are the revolving blades 34, rotating on their pivot-pins and about the common center for more thoroughly mixing the ingredients together.

It is to be understood that my invention is not limited to the specific details of construction shown in the accompanying drawings, but that said details may be varied in the practical carrying out of my invention. It is also to be understood that the combinations specifically set forth in the several claims are intended to be separately claimed without limitation to the use in connection therewith of other features of construction illustrated.

Having thus described my invention, I claim as new and desire to secure by Letters Patent—

1. In a mayonnaise-mixer, a bowl, a cover, means for fastening the cover to the bowl, an oil-dropper adapted to be partly inserted into the bowl through an opening in the cover, a needle-valve in the dropper, stirrer-blades having vertical ends rotating in the outer portion of the bowl about a common center, and revolving blades carried by the stirrer-blades for moving the material in all directions.

2. A mayonnaise-mixer having a receptacle for mixing the material in combination with a plate, means for securing the plate to the receptacle, arms extending above the plate, a vertical shaft extending through the plate into the receptacle, means carried by the arms for turning the shaft, cross-arms carried by the shaft, inwardly-inclined stirrer-blades carried by the cross-arms rotating about the common center and operating over the bottom contiguous to the side walls of the receptacle, rotating curved blades carried upon the cross-arm between the stirrer-blades and the shaft, an oil-cup carried by the plate and partly extending into the receptacle, a valve in the base of the cup for regulating the amount of oil passing to the receptacle and so arranged that the oil will drop into the receptacle between the stirrer-blades and the curved blades, substantially as shown.

In testimony whereof I affix my signature in presence of two witnesses.

ALBERT JOHN SEAMAN.

Witnesses:
CHARLES F. A. SMITH,
SADIE E. POWERS.